(12) United States Patent
Togashi et al.

(10) Patent No.: US 6,813,234 B2
(45) Date of Patent: Nov. 2, 2004

(54) OPTICAL PICKUP DEVICE AND METHOD OF ADJUSTING THE SAME

(75) Inventors: Mitsuhiro Togashi, Yokohama (JP); Naoki Kaiho, Yokohama (JP); Noriyoshi Takeya, Yokohama (JP); Ichiro Morishita, Yokohama (JP)

(73) Assignee: Samsung Electro-Mechanics Co., Ltd., Kyunggi-Do (KR)

( * ) Notice: Subject to any disclaimer, the term of this patent is extended or adjusted under 35 U.S.C. 154(b) by 336 days.

(21) Appl. No.: 10/156,115

(22) Filed: May 29, 2002

(65) Prior Publication Data

US 2003/0103438 A1 Jun. 5, 2003

(30) Foreign Application Priority Data

Dec. 5, 2001 (JP) ........................................ 2001-371884

(51) Int. Cl.⁷ ................................................. G11B 7/00
(52) U.S. Cl. ............................ 369/112.02; 369/112.23; 369/44.23
(58) Field of Search ..................... 369/112.01, 112.02, 369/112.05, 112.08, 112.13, 112.2, 112.22, 112.23, 112.24, 112.26, 100, 103, 44.11, 44.12, 44.23, 44.27, 44.32

(56) References Cited

U.S. PATENT DOCUMENTS 5,859,818 A * 1/1999 Tateishi et al. .......... 369/44.32
6,229,600 B1 * 5/2001 Martynov .................... 356/123
6,532,202 B1 * 3/2003 Wada et al. ............ 369/112.02
6,661,750 B2 * 12/2003 Saimi et al. ............. 369/44.23

* cited by examiner

Primary Examiner—Muhammad Edun
(74) Attorney, Agent, or Firm—Birch, Stewart, Kolasch & Birch, LLP

(57) ABSTRACT

Disclosed herein is an optical pickup device and method of adjusting the same. The optical pickup device and method of adjusting the same of the present invention can correct aberrations due to variation of thickness of an optical disc and dispersion of the emission wavelength by a semiconductor laser, which are generated in manufacturing processes of the optical disc and the optical pickup device, correct aberrations generated in recording/reproducing of the optical disc, due to variation of the emission wavelength and secular changes in the environment of the semiconductor laser, simplify and miniaturize the construction of the optical pickup device, and easily reduce manufacturing cost thereof. The optical pickup device of the present invention has a semiconductor laser (1) and a photo diode (13) for narrowing light emitted from the semiconductor laser (1) to a predetermined diameter and for detecting light reflected and returned from an optical disc (14). Further, the optical pickup device has a relay lens (21) and a liquid crystal aberration correcting device (23) disposed between the semiconductor laser (1) and an object lens (25) for correcting wavefront aberrations and/or remaining wavefront aberrations.

21 Claims, 7 Drawing Sheets

OPTICAL PICKUP DEVICE AND METHOD OF ADJUSTING THE SAME

BACKGROUND OF THE INVENTION

1. Field of the Invention

The present invention relates generally to an optical pickup device and method of adjusting the same, which is suitably used in various recording apparatuses having a function of recording information in optical information recording media, such as digital versatile discs, etc.

2. Description of the Prior Art

Recently, in order to satisfy requirements for recording/reproducing large quantities of information, an optical disc (optical information recording medium) with memory capacity of more than 20 GB is proposed and utilized. An optical pickup device used to record/reproduce information in the optical disc is problematic in that it requires high Numerical Aperture (NA) of a lens to record/reproduce information of high density, and allowable variation of a thickness of the optical disc becomes narrow.

Therefore, in order to correct variances, such as the irregularity of thickness of the optical disc, etc., an optical pickup device using a beam expander is used. (reference document: Japanese Applied Magnetics Society 113th symposium report pp. 85–91, January 2000, by ICHIMURA Isao and KASAMI Utaka).

FIG. 8 is a view showing the construction of a conventional optical pickup device using a beam expander, wherein a Knife Edge method is applied. Referring to FIG. 8, reference numeral 1 designates a semiconductor laser (LD: light emitting device) to emit blue light, for example, with a wavelength of 400 nm, reference numeral 2 a collimate lens, reference numeral 3 a beam shaping prism in which a pair of prisms are arranged in opposite directions, reference numeral 4 a $\lambda/2$ plate, reference numeral 5 a diffraction grating, reference numeral 6 a polarizing beam splitter, reference numeral 7 a $\lambda/4$ plate, reference numeral 8 a beam expander comprised of two lenses, reference numeral 9 an object lens comprised of two pairs of optical parts, reference numeral 10 a knife edge, reference numeral 11 a photo diode (PD: light receiving device) for a monitor, reference numeral 12 a photo diode (PD) for a servo, reference numeral 13 a photo diode (PD) for RF and servo, and reference numeral 14 an optical disc.

In the optical pickup device, irregularity of thickness of the optical disc 14 is adjusted by varying a distance between two lenses constituting the beam expander 8.

However, the conventional optical pickup device using a beam expander is problematic in that it must adjust the distance between two lenses of the corresponding beam expander 8 to cope with the irregularity of thickness of the optical disc 14 (disc thickness variation). Accordingly, it is required to combine an adjustment tool of the beam expander 8 with the optical pickup device, the size of the entire optical pickup device is increased, and the manufacturing cost thereof is also increased.

Further, the number of lenses used in the entire optical pickup device is increased, thus requiring an additional process of adjusting an optical axis, and increasing the manufacturing cost of the optical pickup device.

Further, the conventional optical pickup device using a beam expander is problematic in that it allows deviation in positions of optical parts, such as lenses, due to secular changes in temperature and humidity in use environment, so operations of adjusting the positions of the optical parts and adjusting the optical axis are required.

Meanwhile, an emission wavelength of the semiconductor laser is dispersed to cause aberrations. However, it is difficult to correct such aberrations.

SUMMARY OF THE INVENTION

Accordingly, the present invention has been made keeping in mind the above problems occurring in the prior art, and an object of the present invention is to provide an optical pickup device and method of adjusting the same, which can correct aberrations due to variation of thickness of an optical disc and the dispersion of an emission wavelength by a semiconductor laser, being generated in manufacturing processes of the optical disc and the optical pickup device, correct aberrations generated in recording/reproducing of the optical disc due to variation of the emission wavelength and secular changes in the environment of the semiconductor laser, simplify and miniaturize the construction of the optical pickup device, and easily reduce the manufacturing cost thereof.

In order to accomplish the above object, the present invention provides an optical pickup device and method of adjusting the same.

In accordance with a first aspect of the present invention, the above object can be accomplished by the provision of an optical pickup device, comprising a light emitting device; a lens system for narrowing light emitted from the light emitting device to a predetermined diameter and condensing the narrowed light onto an optical information recording medium; a light receiving device for detecting light reflected and returned from the optical information recording medium; and a second lens disposed between the light emitting device and the lens system for correcting wavefront aberrations and/or remaining wavefront aberrations, the second lens being fixable at an arbitrary position on an optical axis while moving along the optical axis.

The optical pickup device of the present invention can easily correct remaining wavefront aberrations generated in a manufacturing process of the light emitting device due to dispersion of an emission wavelength caused by the light emitting device itself and tolerance of specifications of other optical parts, by disposing the second lens for correcting wavefront aberrations and/or remaining wavefront aberrations between the light emitting device and the lens system, and allowing the second lens to be fixable at an arbitrary position on an optical axis while moving the second lens along the optical axis.

Further, the present invention can easily correct wavefront aberrations generated due to variation of an emission wavelength by the light emitting device and secular change in the environment of the light emitting device.

Moreover, the present invention can simplify the construction of the optical pickup device, realize miniaturization thereof and reduce manufacturing cost thereof by using a construction allowing the second lens to move.

In accordance with a second aspect of the present invention, the above object can be accomplished by the provision of an optical pickup device having the above construction and further comprising a liquid crystal optical device disposed between the light emitting device and the lens system, or within the lens system, for correcting wavefront aberration.

In accordance with a third aspect of the present invention, the above object can be accomplished by the provision of an optical pickup device having the above construction of the first or second aspect of the present invention, wherein the lens system includes a third lens for converting the light emitted from the light emitting device into parallel light, and a fourth lens for narrowing the parallel light from the third lens to a predetermined diameter.

In accordance with a fourth aspect of the present invention, the above object can be accomplished by the provision of an optical pickup device having the above construction of the third aspect of the present invention and further comprising a lens holder to which the fourth lens and the liquid crystal optical device are mounted opposite each other, the lens holder being shakably supported by a plurality of wires.

The optical pickup device of the present invention can reduce deviation of an axis of the liquid crystal optical device and the fourth lens, and increase accuracy of correction of wavefront aberrations by using a construction in which the fourth lens and the liquid crystal optical device are mounted to the lens holder to be opposite each other, and the lens holder is shakably supported by a plurality of wires.

In accordance with a fifth aspect of the present invention, the above object can be accomplished by the provision of an optical pickup device having the above construction of the fourth aspect of the present invention, wherein the fourth lens and the liquid crystal optical device are arranged such that their centers are positioned near a driving center of the lens holder.

The optical pickup device of the present invention can maintain weight balance of the fourth lens and the liquid crystal optical device satisfactorily, and does not need an additional heavy balancer by arranging the fourth lens and the liquid crystal optical device such that their centers are positioned near a driving center of the lens holder. Therefore, the optical pickup device of the present invention can easily realize its miniaturization and reduction of its manufacturing cost.

In accordance with a sixth aspect of the present invention, the above object can be accomplished by the provision of an optical pickup device having the above construction of the fourth or fifth aspect of the present invention, wherein the liquid crystal optical device is designed such that the number of its control terminals is equal to or less than that of the wires and it is electrically controlled through the wires.

The optical pickup device of the present invention can electrically control the liquid crystal optical device through a plurality of wires, does not need additional signal lines for controlling the liquid crystal optical device, and can reduce undesirable effects, such as natural vibration of a driving means like an actuator, generated due to the signal lines for controlling the liquid crystal optical device.

In accordance with a seventh aspect of the present invention, the above object can be accomplished by the provision of an optical pickup device having the above construction of any of the fourth to sixth aspect of the present and further comprising moving magnet-type driving means mounted to the lens holder.

In accordance with an eighth aspect of the present invention, the above object can be accomplished by the provision of an optical pickup device, the optical pickup device comprising a light emitting device, a lens system for narrowing light emitted from the light emitting device to a predetermined diameter and condensing the narrowed light onto an optical information recording medium, a light receiving device for detecting light reflected and returned from the optical information recording medium, and a second lens disposed between the light emitting device and the lens system for correcting wavefront aberrations/or remaining wavefront aberrations, comprising the step of a position of the second lens on the basis of at least one of various pieces of information about one or more parts constituting the light emitting device, the lens system and the light receiving device, about quality of recorded/reproduced information of the optical information recording media as a reference, and about quality of information in recording/reproducing of the optical information recording media.

The optical pickup device adjustment method can easily correct any of remaining wavefront aberrations generated in a manufacturing process of the optical pickup device due to dispersion of an emission wavelength caused by the light emitting device itself and tolerance of specifications of other optical parts, and wavefront aberrations generated due to variation of the emission wavelength by the light emitting device and secular changes in the environment.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, preferred embodiments of an optical pickup device and method of adjusting the same according to the present invention will be described in detail with reference to the attached drawings.

Figure 1:
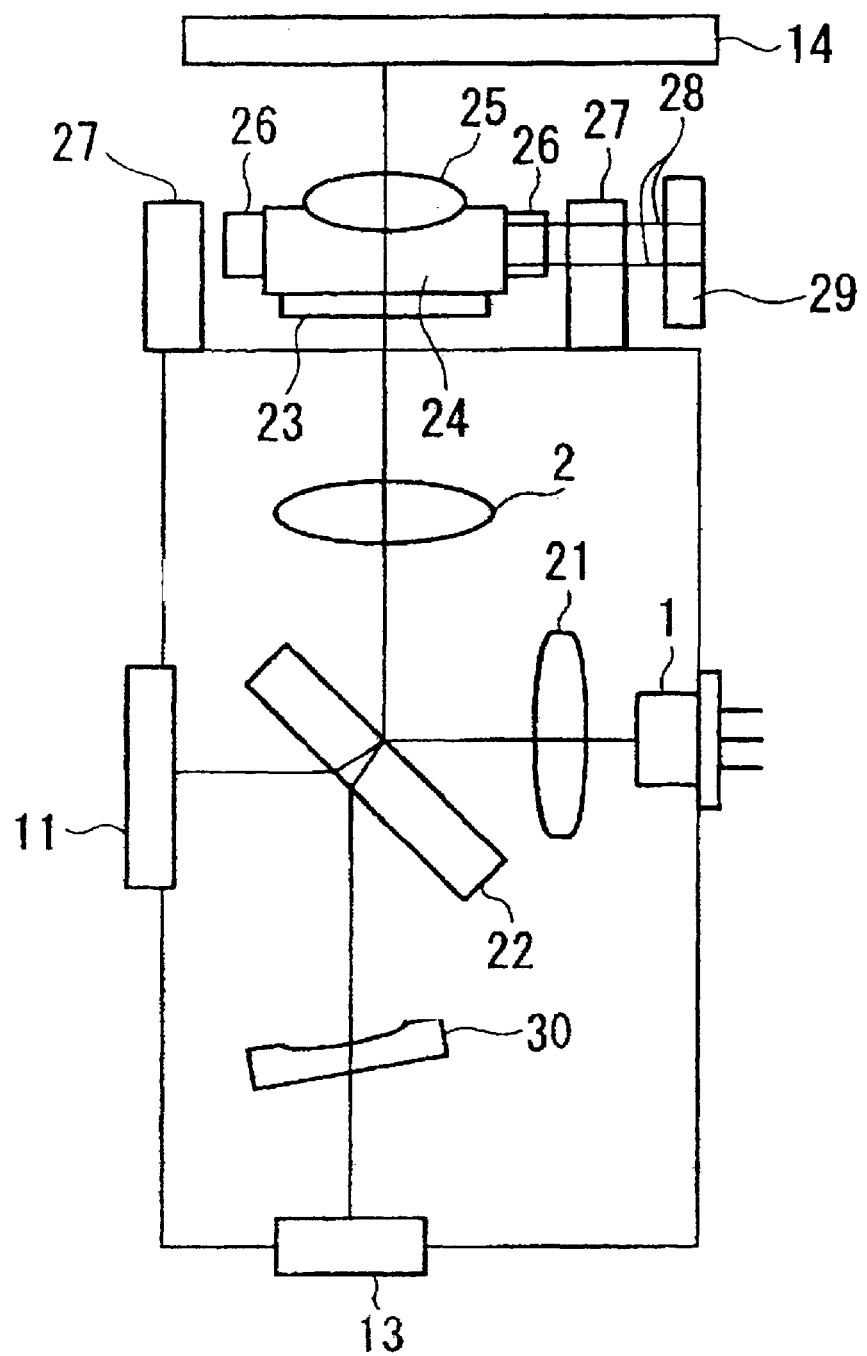
FIG. 1 is a view showing the construction of an optical pickup device according to a preferred embodiment of the present invention.
Figure 8:
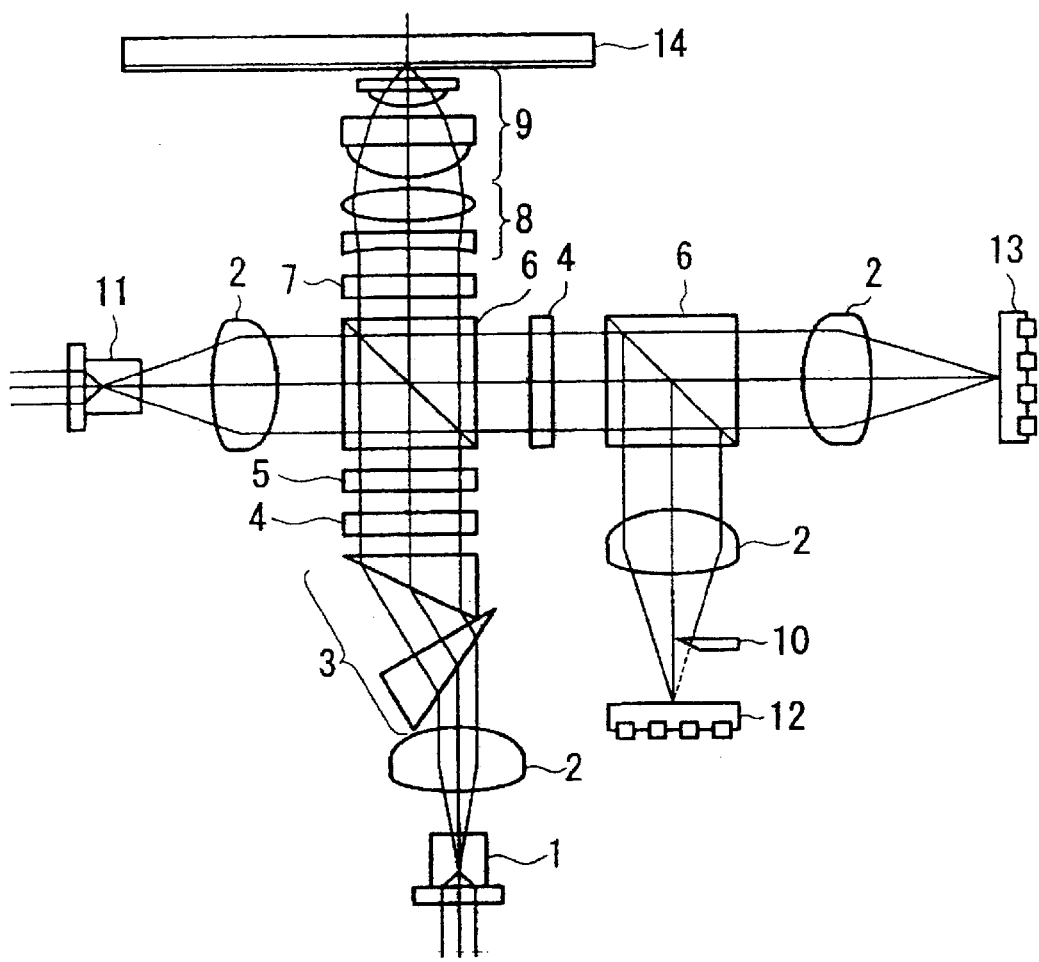
FIG. 8 is a view showing the construction of a conventional optical pickup device using a beam expander.

FIG. 1 is a view showing the construction of an optical pickup device according to a preferred embodiment of the present invention, wherein the optical pickup device is a pickup device of an infinite optical system, using a collimate lens. In this case, the same reference numerals as those of FIG. 8 are used in FIG. 1 to designate the same or similar components, and detailed descriptions of the same components are omitted.

Referring to FIG. 1, reference numeral 21 designates a relay lens (second lens), reference numeral 22 a half mirror, reference numeral 2 a collimate lens (third lens), reference numeral 23 a liquid crystal aberration correcting device (liquid crystal optical device), reference numeral 24 a lens holder, reference numeral 25 an object lens (fourth lens), reference numeral 26 moving magnets, reference numeral 27 coils, reference numeral 28 wires, reference numeral 29 a wire fixing part 29, and reference numeral 30 a sensor lens.

The relay lens 21 is used to correct remaining wavefront aberrations generated due to dispersion of the emission wavelength by the semiconductor laser 1 itself or tolerance of specifications of other optical parts in a manufacturing process of the optical pickup device, and wavefront aberrations generated due to variation of the emission wavelength by the semiconductor laser 1 and secular changes in the use environment during recording/reproducing of an optical disc (optical information recording medium). The relay lens 21 is disposed on an optical axis on the side of an emitting part of the semiconductor laser 1, and can be fixed at an arbitrary position on the optical axis while moving along the optical axis.

The remaining wavefront aberrations and wavefront aberrations are corrected by adjusting the position of the relay lens 21 on the optical axis.

Meanwhile, the object lens 25 is mounted on the lens holder 24 while the liquid crystal aberration correcting device 23 is mounted beneath the lens holder 24 such that they are on the same optical axis, or they are arranged opposite each other. The moving magnets 26 are mounted to both side surfaces of the lens holder 24. The lens holder 24 is fixed to the wire fixing part 29 after its one end is supported by a plurality of wires 28.

In the preferred embodiment of this invention, two pairs of wires 28 are attached to both sides of the lens holder 24, respectively, thus allowing the lens holder 24 to be shakably supported by a total of four wires 28. Such wires 28 can also be used as signal lines to control the liquid crystal aberration correcting device 23.

The lens holder 24 is constructed to allow a moving magnet-type actuator consisting of the moving magnets 26 and the coils 27 to be driven by a control circuit (not shown).

Figure 2:
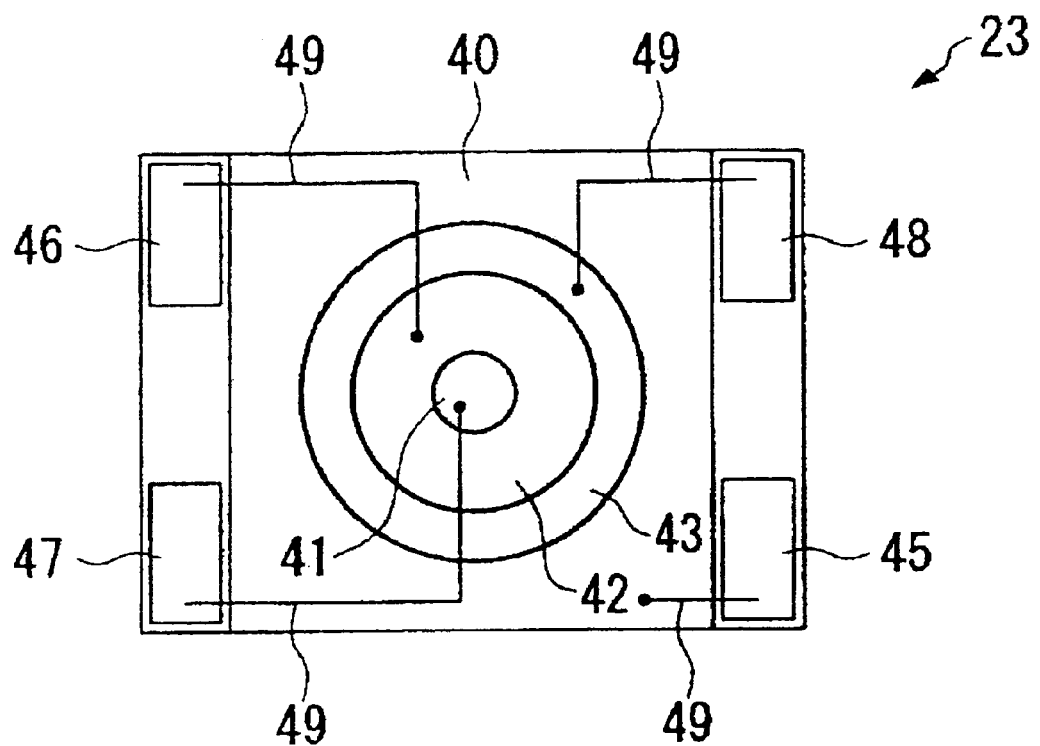
FIG. 2 is a plan view showing a liquid crystal aberration correcting device of the optical pickup device according to the present invention.

The liquid crystal aberration correcting device 23 corrects wavefront aberrations generated due to irregularity of the thickness of an optical disc in recording/reproducing of the optical disc. An electrode 40 and three concentric electrodes 41 to 43 are formed in a main surface of the liquid crystal aberration correcting device 23, as shown in FIG. 2. The electrodes 40 to 43 are formed to apply control signals through the four wires 28. Four control terminals, that is, a common terminal 45 and terminals 46 to 48 corresponding to three electrode regions, are arranged around the electrodes 40 to 43.

Further, the electrodes 40 to 43 are electrically connected to the common terminal 45 and the terminals 46 to 48 by electrode-terminal connection lines 49.

The number of control terminals is equal to or less than that of the wires 28 (here, equal to or less than 4). The liquid crystal aberration correcting device 23 generates aberration by receiving control signals from the outside through the four wires 28 supporting the lens holder 24 and electrically controlling the lens holder 24, and corrects wavefront aberrations generated during recording/reproducing of the optical disc on the basis of the above aberration. The wires 28 and the liquid crystal aberration correcting device 23 are connected to each other using, for example, flexible cables (not shown).

The liquid crystal aberration correcting device 23 and the object lens 25 are attached to the lens holder 24 such that their centers are positioned near a driving center of the lens holder 24.

For example, the weight of the liquid crystal aberration correcting device 23 is 59 mg, while the weight of the object lens 25 is 63 mg. In this case, the weights of the liquid crystal aberration correcting device 23 and the object lens 25 are set to be approximately the same. The liquid crystal aberration correcting device 23 and the object lens 25 are disposed above and beneath the driving center of the lens holder 24 to balance related weights.

In the optical pickup device, laser light emitted from the semiconductor laser 1 is irradiated to the optical disc 14 through the relay lens 21, the half mirror 22, the collimate lens 2, the liquid crystal aberration correcting device 23 and the object lens 25.

There is dispersion of an emission wavelength due to a device itself, as one of variations generated when the semiconductor laser 1 is manufactured, wherein if the emission wavelength of the laser light is 405 nm, the wavelength dispersion is 400 to 410 nm.

Figure 3:
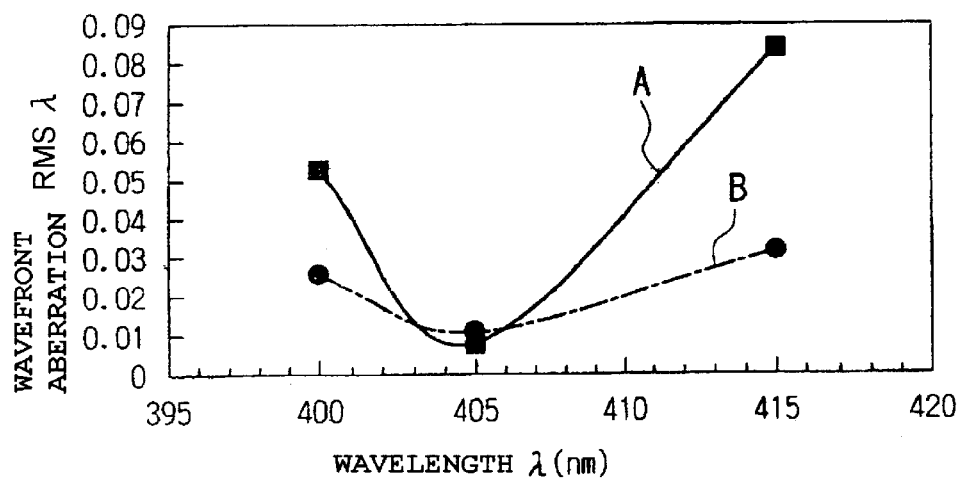
FIG. 3 is a graph showing effect of correction of an emission wavelength of a semiconductor laser using fine adjustment of a relay lens according to the present invention.

In the prior art, as indicated by a curve A of FIG. 3, if the semiconductor laser 1 having an emission wavelength of 410 nm is used, the wavefront aberration RMS is deteriorated to $0.04\lambda$, while if the semiconductor laser 1 having an emission wavelength of 400 nm is used, the wavefront aberration RMS is deteriorated to $0.05\lambda$.

Figure 4:
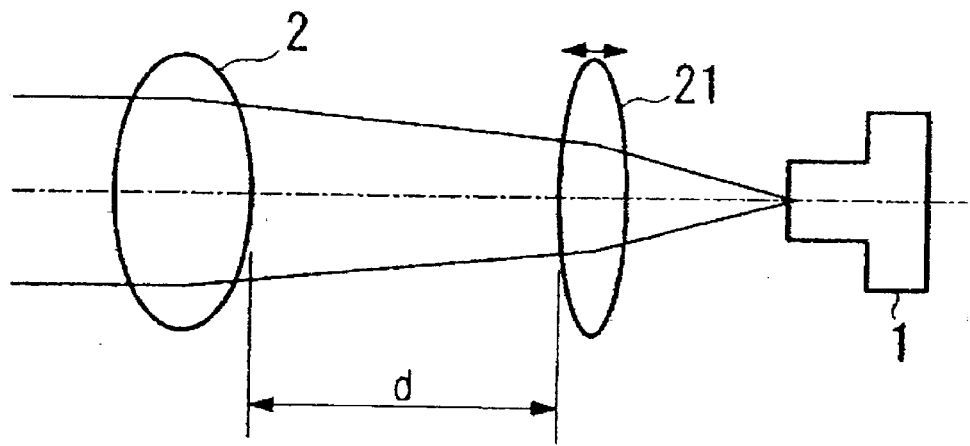
FIG. 4 is a view showing the amount of fine adjustment of the relay lens according to the present invention.

Then, as shown in FIG. 4, the wavelength dispersion generated when the semiconductor laser 1 is manufactured is eliminated and the wavefront aberrations are corrected by varying the gap "d" between the relay lens 21 and the collimate lens 2 by finely adjusting the position of the relay lens 21 along the optical axis. In this embodiment, the collimate lens 2 with a focal distance (f) of 30 mm and the relay lens 21 with a focal distance (f) of 12 mm are used.

Through this correction, the deterioration of wavefront aberration, such as a curve B of FIG. 3, can be corrected.

The correction of the initial state of the emission wavelength by the semiconductor laser 1 using the relay lens 21 is carried out on the basis of inspection data of the semiconductor laser 1 attached at the time of delivery. The adjustment of the position of the relay lens 21 is performed with the semiconductor laser 1 combined with the optical pickup device to emit light, for example, by obtaining values, such as jitter of a waveform of a real reproducing signal, error rate, etc., using a test optical disc supported by a glass.

Next, a method of measuring a jitter value at the initial state is described in detail with reference to FIG. 5.

A test optical disc 52 is set on a turntable fixed to a spindle motor 51 of a recording/reproducing apparatus for recording/reproducing optical information onto/from an optical disc. Then, a semiconductor laser in the optical pickup device 53 emits laser light to the test optical disc 52. Further, the laser light is focused by tuning a focus coil (not shown) upwardly and downwardly. A focus error signal (FE) is generated by a well-known method, such as an astigmatism method, using a reproduced signal obtained by the test optical disc 52, and then a focus servo is closed.

Then, a tracking error signal (TE) is generated by a well-known method, such as a push-pull method, using the reproduced signal obtained by the test optical disc 52, and a tracking servo is closed.

Further, an RF signal is generated using the reproduced signal obtained by the test optical disc 52 and a waveform shaping operation for the RF signal is performed. A pulse signal, for example, of 3T data, is extracted using a data extractor.

Further, a clock signal CLK, which is a basis of reproduction, is obtained from a control circuit which controls the recording/reproducing apparatus. A jitter calculating circuit calculates a jitter value using the clock signal CLK and the 3T data, and sends the jitter value to a jitter determining circuit.

The jitter determining circuit determines jitter by comparing the jitter value obtained by the calculation with a set jitter value. For example, if the jitter value obtained by the calculation is greater than the jitter value set on the basis of a statistical jitter value present at the time of manufacturing the recording/reproducing apparatus, the jitter determining circuit determines the jitter as positive (+). Further, if the jitter value obtained by the calculation is less than the set jitter value, the jitter determining circuit determines the jitter as negative (−).

Such determined results are displayed on a display unit installed in the recording/reproducing apparatus, or a display device, such as a television (TV) monitor or a liquid crystal display, connected to the recording/reproducing device.

The position of the relay lens 21 is adjusted while referring to the displayed determined results such that the jitter value obtained by the calculation becomes the set jitter value.

As described above, the wavelength dispersion generated when the semiconductor laser 1 is manufactured can be eliminated and wavefront aberrations can be corrected by adjusting the position of the relay lens 21.

In this embodiment of the present invention, a jitter value measuring method using internal circuits of the recording/reproducing apparatus is described. However, other methods, for example, a method of adjusting the position of the relay lens 21 while measuring a jitter value using a jitter meter, can also be used.

Further, the adjustment of the position of the relay lens 21 can be automatically performed by outputting the determined results as signals and applying the signals to an additionally produced adjuster.

In this embodiment of this invention, only a method of adjusting the position using the jitter value is described. However, the same adjustment can be performed by also using an error rate. In this case, the position of the relay lens 21 can be preferably adjusted by obtaining the error rate from a demodulated signal.

As described above, the remaining wavefront aberrations generated due to dispersion of an emission wavelength present in the initial state of the semiconductor laser 1 itself can be corrected by finely adjusting the position of the relay lens 21 along the optical axis.

The emission wavelength by the semiconductor laser 1 is also varied according to temperature variation and secular change in the environment, similarly to dispersion of the initial state. If the emission wavelength is varied, the wavefront aberration RMS is deteriorated, as shown in curve A of FIG. 3.

In this case, the emission wavelength by the semiconductor laser 1, varied due to temperature variation and secular change in the environment, can be corrected by using the relay lens 21.

Next, a method of measuring a jitter value after temperature variation and secular change occur is described in detail with reference to FIG. 6. Here, descriptions of the same components as those of FIG. 5 are omitted.

Figure 5:
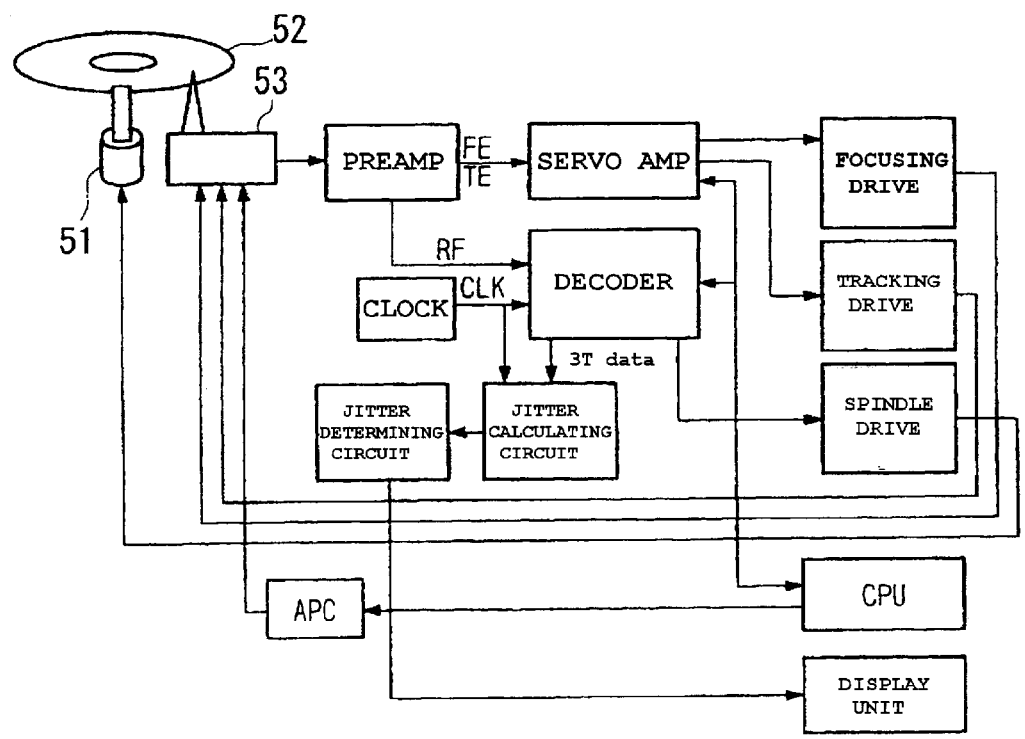
FIG. 5 is a jitter determination block diagram showing a jitter value measuring method at an initial state when the relay lens is used according to the present invention.

In the jitter value measuring method, the focus servo and tracking servo, which are the same as those of the method of FIG. 5, are closed, and an RF signal is generated from a reproduced signal obtained by the test optical disc 52. A pulse signal, for example, of 3T data is extracted from the RF signal by a data extractor. The jitter calculating circuit calculates a jitter value and sends the jitter value to the jitter determining circuit.

The jitter determining circuit determines jitter by comparing the jitter value obtained by the calculation with a set jitter value, and outputs the determined results as electrical signals. For example, if the jitter value obtained by the calculation is equal to the jitter value set on the basis of a statistical jitter value present at the time of manufacturing the recording/reproducing apparatus, the jitter determining circuit outputs a determination signal indicating zero (0). Further, if the jitter value obtained by the calculation is greater than the set jitter value, the jitter determining circuits outputs a determination signal indicating positive (+), while if the jitter value obtained by the calculation is less than the set jitter value, the jitter determining circuit outputs a determination signal indicating negative (−). For example, the jitter determining circuit outputs determination signals, such as zero (0)=2.5V, positive (+)=5V and negative (−)=0V. The determination signals are transmitted to a relay lens control circuit.

The relay lens control circuit generates driving signals for driving the relay lens 21 according to the kinds of the determination signals. If a determination signal indicates positive (+), the relay lens control circuit generates a driving signal for moving the relay lens closer to the semiconductor laser 1 from its current position (that is, to widen the gap between the collimate lens 2 and the relay lens 21). If a determination signal indicates negative (−), the relay lens control circuit generates a driving signal for moving the relay lens 21 farther from the semiconductor laser 1 than its current position (that is, to narrow the gap between the collimate lens 2 and the relay lens 21). On the other hand, if a determination signal indicates zero (0), the relay lens control circuit does not generate a driving signal for moving the relay lens 21.

A relay lens driving circuit adjusts the position of the relay lens 21 by driving the relay lens 21 according to the inputted driving signals.

As described above, the dispersion of an emission wavelength due to temperature variation and secular change in the environment of the semiconductor laser 1 is corrected by adjusting the position of the relay lens 21. Therefore, wavefront aberrations can be corrected, and an original performance after manufacturing of the semiconductor laser 1 can be maintained, thus improving reliability of the optical pickup device.

In the optical pickup device, variation of wavefront aberrations due to variation of thickness of the optical disc 14 by high numerical aperture (NA=0.85) of the object lens 25 must be corrected.

For example, if the thickness of the optical disc 14 varies by ±10 $\mu$m, a wavefront aberration of about 0.1 to 0.12$\lambda$ is generated, while if the thickness of the optical disc 14 varies by ±5 $\mu$m, a wavefront aberration of about 0.05 to 0.06$\lambda$ is generated (reference document: "Phase change optical recording using celadon semiconductor laser and object lens with high numerical aperture" disclosed in Japanese Applied Magnetics Society 113th research data p85–91, 2000, by ICHIMURA Isao and KASAMI Utaka).

As shown in FIG. 4, wavelength dispersion characteristics present at the time of manufacturing the semiconductor laser 1 are eliminated and wavefront aberrations are corrected by adjusting the gap "d" between the collimate lens 2 and the relay lens 21. Accordingly, variation of thickness of the disc 14 can be corrected by finely adjusting the position of the relay lens 21 on the optical axis.

Figure 6:
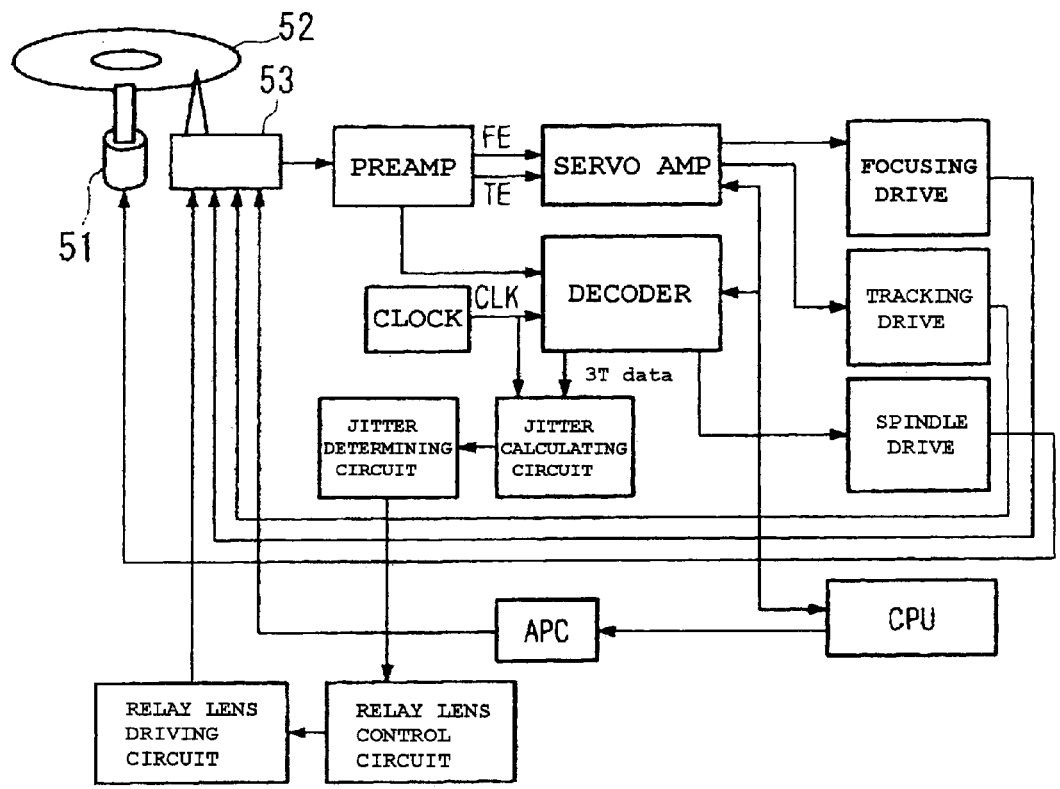
FIG. 6 is a jitter determination block diagram showing a jitter value measuring method after temperature variation and secular change occur when the relay lens is used according to the present invention.

This adjustment method of FIG. 6 is the same as the above adjustment method based on the jitter value measuring method upon temperature variation and secular change. Further, the adjustment method can obtain jitter or error rate from a signal obtained by optical information reproduction, and drive the relay lens 21 on the basis of the jitter or the error rate.

In this embodiment of the present invention, a method of correcting the variation of thickness of the disc 14 by finely adjusting the position of the relay lens 21 on the optical axis is described. However, the variation of thickness of the disc 14 can also be corrected by using the liquid crystal aberration correcting device 23. Furthermore, wavefront aberrations of an optical system can be exactly corrected by combining the relay lens 21 with the liquid crystal aberration correcting device 23.

There can be employed a variety of correcting methods including the following methods in the present invention: For example, if the variation of thickness of the disc 14 is small, the correction is performed by the liquid crystal aberration correcting device 23, while if the variation of thickness of the disc 14 is large, the correction is performed by the relay lens 21. Further, rough correction is first performed by the relay lens 21, and fine adjustment is next performed by the liquid crystal aberration correcting device 23. Alternatively, rough correction may be first performed by the liquid crystal aberration correcting device 23, and fine adjustment may be next performed by the relay lens 21.

The liquid crystal aberration correcting device 23 does not require mechanical control. The liquid crystal aberration correcting device 23 is advantageous in that it can reduce a number of operating parts, increase reliability of an optical pickup device, miniaturize the entire optical pickup device, and reduce manufacturing cost thereof.

Figure 7:
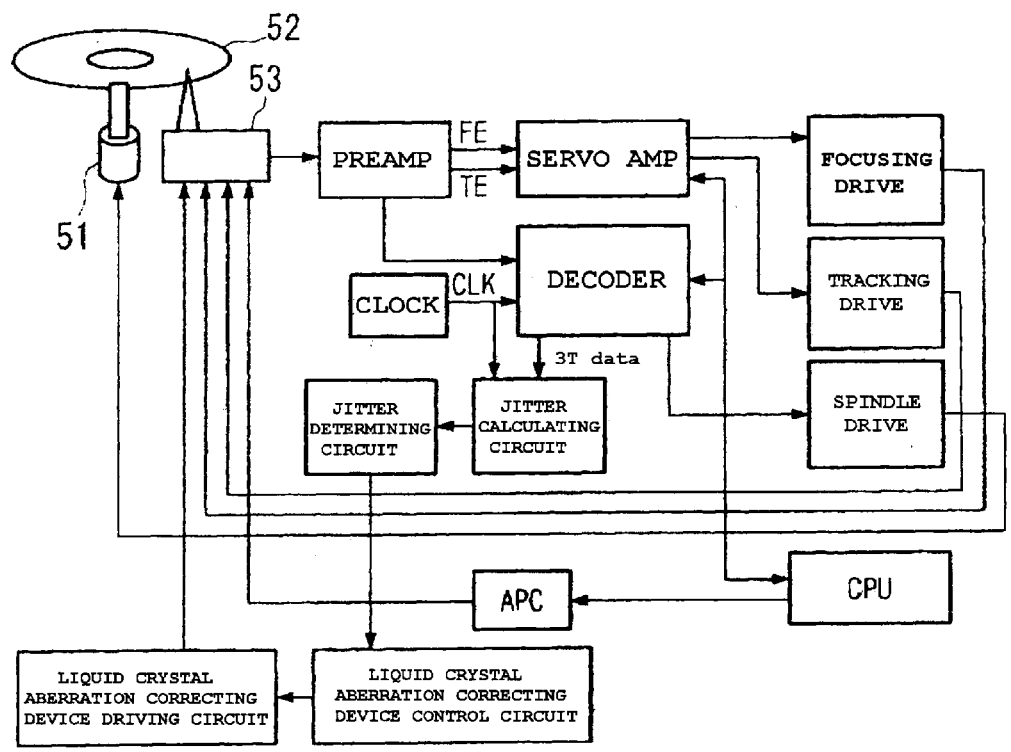
FIG. 7 is a jitter determination block diagram showing a jitter value measuring method after temperature variation and secular change occur when a liquid crystal aberration correcting device is used according to the present invention.

FIG. 7 is a block diagram of an apparatus for performing a jitter value measuring method when the liquid crystal aberration correcting device 23 is used.

This method of FIG. 7 is only different from the above jitter value measuring method of FIG. 6 in that the relay lens control circuit is replaced by a liquid crystal aberration correcting device control circuit, and the relay lens driving circuit by a liquid crystal aberration correcting device driving circuit. Measuring principles of the method of FIG. 7 are entirely the same as those of the above method of FIG. 6, and descriptions thereof are omitted.

As described above, in the optical pickup device according to the preferred embodiment of the present invention, the relay lens 21 is disposed between the semiconductor laser 1 and the collimate lens 2 on the optical axis, and the position of the relay lens 21 on the optical axis is adjusted, thus enabling remaining wavefront aberrations and wavefront aberrations to be corrected.

Further, wavefront aberrations can be corrected using only the relay lens 21, thus simplifying construction of an adjustment tool, realizing miniaturization of the optical pickup device and reducing manufacturing cost of the optical pickup device.

Further, wavefront aberrations can be corrected using only the liquid crystal aberration correcting device 23, thus reducing a number of operating parts, improving reliability of the optical pickup device, realizing miniaturization thereof, and reducing manufacturing cost thereof.

Further, the remaining wavefront aberrations and the wavefront aberrations can be exactly corrected and reliability of the optical pickup device can be greatly improved by combining the relay lens 21 with the liquid crystal aberration correcting device 23.

Further, the liquid crystal aberration correcting device 23 is constructed such that it is driven by four wires 28 supporting the lens holder 24, which are inserted into the liquid crystal aberration correcting device 23, thus simplifying the construction of the optical pickup device, and reducing undesirable effects, such as natural vibration of an actuator due to signal lines to control the liquid crystal aberration correcting device 23. Therefore, reliability of the optical pickup device is greatly improved, its miniaturization is realized, and its manufacturing cost is reduced.

Moreover, the weights of the liquid crystal aberration correcting device 23 and the object lens 25 are set to values approximately the same. Further, the liquid crystal aberration correcting device 23 and the object lens 25 are arranged above and beneath the driving center of the lens holder 24 to balance related weights. Accordingly, there is no need to mount a heavy balancer like a conventional optical pickup device, thereby realizing miniaturization of the optical pickup device, and reducing manufacturing cost thereof.

As described above, the present invention provides an optical pickup device and method of adjusting the same, in which a second lens for correcting wavefront aberrations or remaining wavefront aberrations, or both of them, is disposed between a light emitting device and a lens system, wherein the second lens freely moves along an optical axis and is fixed at an arbitrary position on the optical axis, thus enabling easy correction of remaining wavefront aberrations generated due to dispersion of an emission wavelength caused by the light emitting device itself or tolerance of specifications of other optical parts in a manufacturing process of the optical pickup device, and wavefront aberrations generated due to variation of the emission wavelength by the light emitting device or secular changes in the environment of the light emitting device.

Further, wavefront aberration correction can be performed using only the second lens, thus simplifying the construction of the optical pickup device, and easily realizing miniaturization thereof and reduction of manufacturing cost.

Further, in addition to the above construction, a liquid crystal optical device is disposed between the light emitting device and the lens system, or within the lens system, so as to correct wavefront aberrations, thus enabling wavefront aberrations generated by irregularity of thickness of an optical information recording medium, etc. to be easily corrected.

The liquid crystal optical device can allow a number of mechanical parts, such as operating parts, to be reduced, thereby simplifying the construction of the optical pickup device, improving its reliability, and realizing its miniaturization and reduction of its manufacturing cost.

Moreover, wavefront aberrations of an optical system can be exactly or easily corrected by combining the second lens with the liquid crystal optical device.

Furthermore, the present invention can reduce deviation of an axis of both the liquid crystal optical device and a fourth lens, and increase accuracy of the correction of wavefront aberrations by arranging the fourth lens and the liquid crystal optical device opposite each other, mounting them to the lens holder, and then allowing the lens holder to be shakably supported by a plurality of wires.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical pickup device comprising;
   a light emitting device;
   a lens system for narrowing light emitted from the light emitting device to a predetermined diameter and condensing the narrowed light onto an optical information recording medium;
   a light receiving device for detecting light reflected and returned from the optical information recording medium; and
   a second lens disposed between the light emitting device and the lens system for correcting wavefront aberrations and/or remaining wavefront aberrations, the second lens being fixable at an arbitrary position on an optical axis while moving along the optical axis.

2. The optical pickup device according to claim 1, further comprising a liquid crystal optical device disposed between the light emitting device and the lens system, or within the lens system, for correcting wavefront aberrations.

3. The optical pickup device according to claim 2, wherein the lens system further comprises a third lens for converting the light emitted from the light emitting device into parallel light, and a fourth lens for narrowing the parallel light from the third lens to a predetermined diameter.

4. The optical pickup device according to claim 3, further comprising a lens holder to which the fourth lens and the liquid crystal optical device are mounted opposite each other, the lens holder being shakably supported by a plurality of wires.

5. The optical pickup device according to claim 4, wherein the fourth lens and the liquid crystal optical device are arranged such that their centers are positioned near a driving center of the lens holder.

6. The optical pickup device according to claim 5, wherein the liquid crystal optical device is designed such that the number of its control terminals is equal to or less than that of the wires and it is electrically controlled through the wires.

7. The optical pickup device according to claim 6, further comprising moving magnet-type driving means mounted to the lens holder.

8. The optical pickup device according to claim 5, further comprising moving magnet-type driving means mounted to the lens holder.

9. The optical pickup device according to claim 4, wherein the liquid crystal optical device is designed such that the number of its control terminals is equal to or less than that of the wires and it is electrically controlled through the wires.

10. The optical pickup device according to claim 9, further comprising moving magnet-type driving means mounted to the lens holder.

11. The optical pickup device according to claim 4, further comprising moving magnet-type driving means mounted to the lens holder.

12. The optical pickup device according to claim 1, wherein the lens system further comprises a third lens for converting the light emitted from the light emitting device into parallel light, and a fourth lens for narrowing the parallel light from the third lens to a predetermined diameter.

13. The optical pickup device according to claim 12, further comprising a lens holder to which the fourth lens and the liquid crystal optical device are mounted opposite each other, the lens holder being shakably supported by a plurality of wires.

14. The optical pickup device according to claim 13, wherein the fourth lens and the liquid crystal optical device are arranged such that their centers are positioned near a driving center of the lens holder.

15. The optical pickup device according to claim 14, wherein the liquid crystal optical device is designed such that the number of its control terminals is equal to or less than that of the wires and it is electrically controlled through the wires.

16. The optical pickup device according to claim 15, further comprising moving magnet-type driving means mounted to the lens holder.

17. The optical pickup device according to claim 14, further comprising moving magnet-type driving means mounted to the lens holder.

18. The optical pickup device according to claim 13, wherein the liquid crystal optical device is designed such that the number of its control terminals is equal to or less than that of the wires and it is electrically controlled through the wires.

19. The optical pickup device according to claim 18, further comprising moving magnet-type driving means mounted to the lens holder.

20. The optical pickup device according to claim 13, further comprising moving magnet-type driving means mounted to the lens holder.

21. A method of adjusting an optical pickup device, the optical pickup device comprising a light emitting device, a lens system for narrowing light emitted from the light emitting device to a predetermined diameter and condensing the narrowed light onto an optical information recording medium, a light receiving device for detecting light reflected and returned from the optical information recording medium, and a second lens disposed between the light emitting device and the lens system for correcting wavefront aberrations and/or remaining wavefront aberrations, comprising the step of:
   adjusting a position of the second lens on the basis of at least one of various pieces of information about one or more parts constituting the light emitting device, the lens system and the light receiving device, about quality of recorded/reproduced information of the optical information recording media as a reference, and about quality of information in recording/reproducing of the optical information recording media.

* * * * *